United States Patent
Abts

(10) Patent No.: US 6,337,971 B1
(45) Date of Patent: *Jan. 8, 2002

(54) SYSTEM FOR CONTROLLING AND MONITORING AGRICULTURAL FIELD EQUIPMENT AND METHOD

(76) Inventor: Gerald L. Abts, 567 Steele St., Denver, CO (US) 80206

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 9 days.

(21) Appl. No.: 08/950,323

(22) Filed: Oct. 14, 1997

(51) Int. Cl.[7] ................................ H04Q 7/14

(52) U.S. Cl. ................ 455/31.1; 340/310.01; 454/256; 331/65

(58) Field of Search .............. 455/31.1, 256; 340/310.1; 331/65; 119/498

(56) References Cited

U.S. PATENT DOCUMENTS

| | | | |
|---|---|---|---|
| 3,289,165 A | 11/1966 | Hawley et al. | 340/151 |
| 4,396,149 A | 8/1983 | Hirsch | 239/63 |
| 4,477,809 A | 10/1984 | Bose | 340/825.54 |
| 4,602,340 A * | 7/1986 | Appelberg | 340/310.01 |
| 4,626,984 A | 12/1986 | Unruh et al. | 364/132 |
| 4,856,047 A | 8/1989 | Saunders | 379/57 |
| 4,899,934 A | 2/1990 | Krisle | 239/1 |
| 4,962,522 A | 10/1990 | Marian | 379/5 |
| 5,146,216 A | 9/1992 | DeLuca et al. | 340/825.52 |
| 5,182,553 A * | 1/1993 | Kung | 340/825.44 |
| 5,194,860 A | 3/1993 | Jones et al. | 340/370.02 |
| 5,246,164 A | 9/1993 | McCann et al. | 239/11 |
| 5,255,857 A | 10/1993 | Hunt | 239/731 |

(List continued on next page.)

OTHER PUBLICATIONS

Sensing and Control, Inc., "Flexible Pivot Automation . . . ", Sep. 27, 1995.
Lockwood Corporation, "Lockwood Electronic Automated Panel," Sep. 5, 1991.
Irrigation Advances, "Voice from Pivots . . . ", p. 22, Jan. 1992.
Valley, "C:A:M:S Base Station," Dec. 1992.
Valmont Industries, Inc., "New High–Tech Tool . . . ," Summer 1996, p. 4.
Lindsay Manufacturing Co., "Introducing R–MAC," Jan. 1990.
Irrigation Advances, "Irrigation is Automatic . . . ," Spring 1994, pp. 12–14.
Reinke Irrigation Systems, Inc., "Master Control," Dec. 1995, p. 10.#jf139##

*Primary Examiner*—William Cumming
(74) *Attorney, Agent, or Firm*—Dorr, Carson, Sloan & Birney, P.C.

(57) ABSTRACT

A pager system for monitoring the operation of a plurality of controllers in each one of a plurality of agricultural field equipment in a group. A plurality of sensors are provided at each location of agricultural field equipment wherein a sensor connects through an isolation device to one of the controllers for issuing a status signal corresponding to the present status of the connected controller. Whenever the status of a controller changes, the remote terminal unit immediately transmits the changed status symbol as well as the status of the other sensors to a central control computer. The central control computer analyzes the transmitted status signals for generating a changed status paging message and delivers the changed status paging message, identifying the agricultural field equipment having the changed status, as well as the unchanged status messages from all remaining agricultural field equipment in the group. The paging messages are delivered to a pager held by an operator at a remote location with the changed status paging message marked so that the operator can identify which piece of agricultural field equipment had its status changed.

19 Claims, 7 Drawing Sheets

U.S. PATENT DOCUMENTS

| | | | | |
|---|---|---|---|---|
| 5,339,051 A | * | 8/1994 | Koehler et al. | 331/65 |
| 5,379,030 A | | 1/1995 | Nolan et al. | 340/825.03 |
| 5,438,329 A | | 8/1995 | Gastouniotis et al. | 340/870.02 |
| 5,488,817 A | * | 2/1996 | Paquet et al. | 56/10.2 R |
| 5,530,438 A | * | 6/1996 | Bickham et al. | 340/825.34 |
| 5,596,315 A | * | 1/1997 | Olds et al. | 340/825.03 |
| 5,631,635 A | * | 5/1997 | Robertson et al. | 340/825.41 |
| 5,706,211 A | * | 1/1998 | Beletic et al. | 340/311.1 |
| 5,708,781 A | * | 1/1998 | Chiashi et al. | 340/825.44 |
| 5,917,405 A | * | 6/1999 | Joao | 340/426 |
| 5,924,924 A | * | 7/1999 | Richardson | 454/256 |

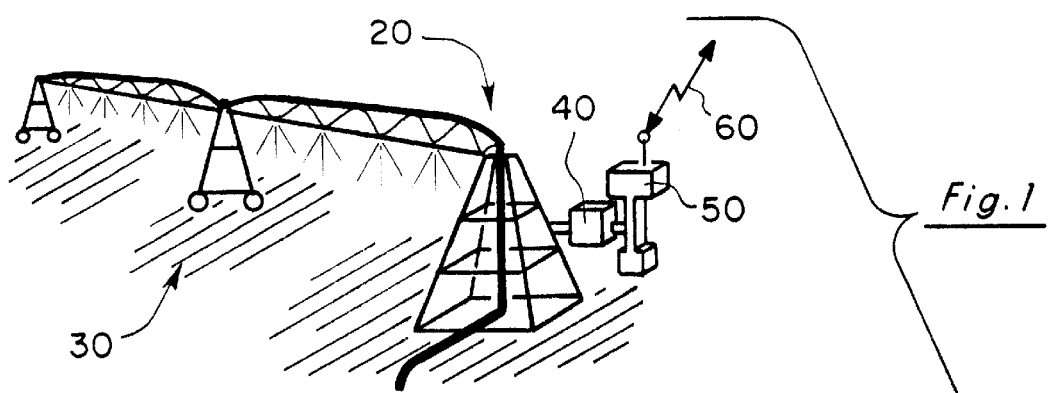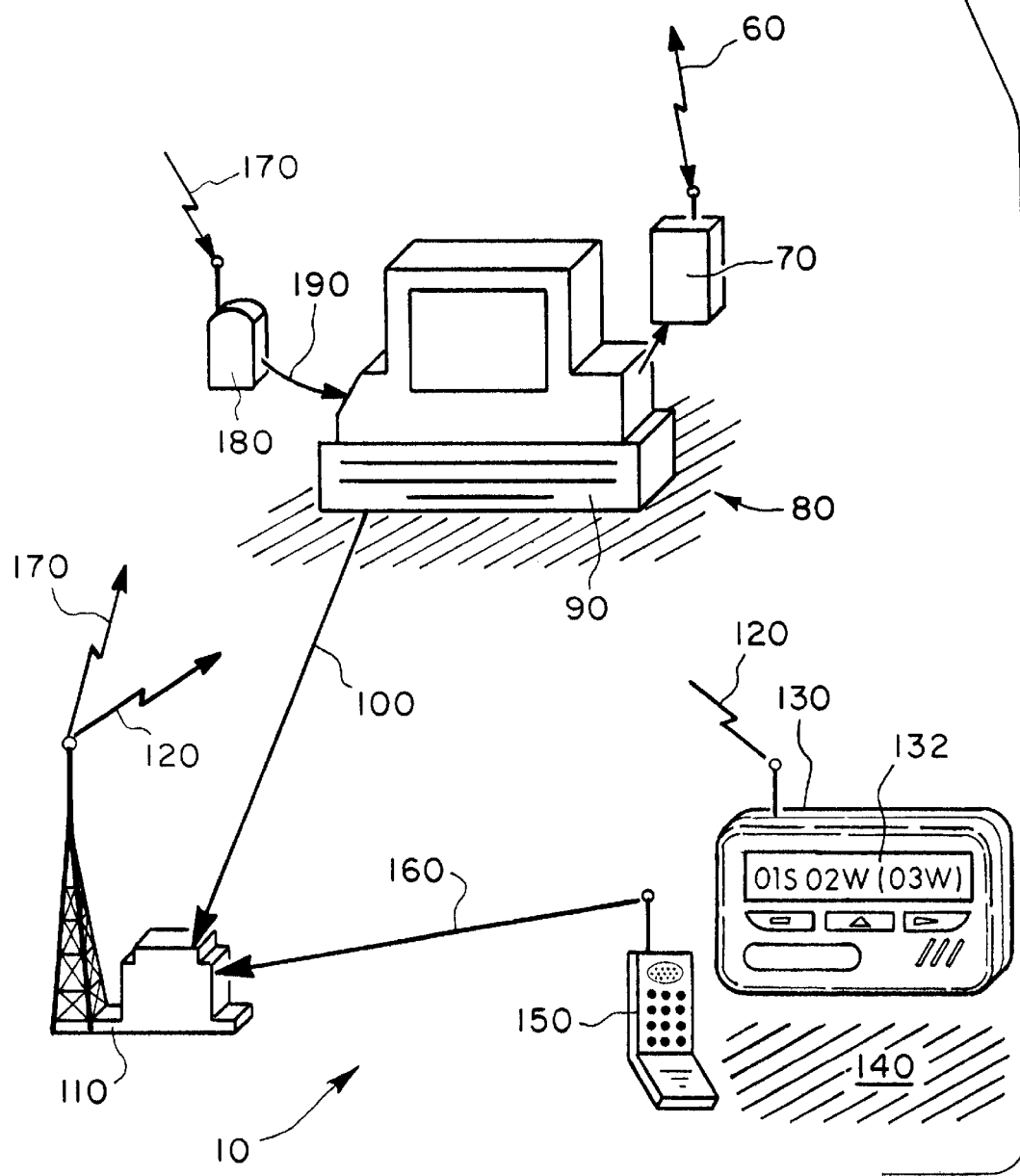
Fig. 1

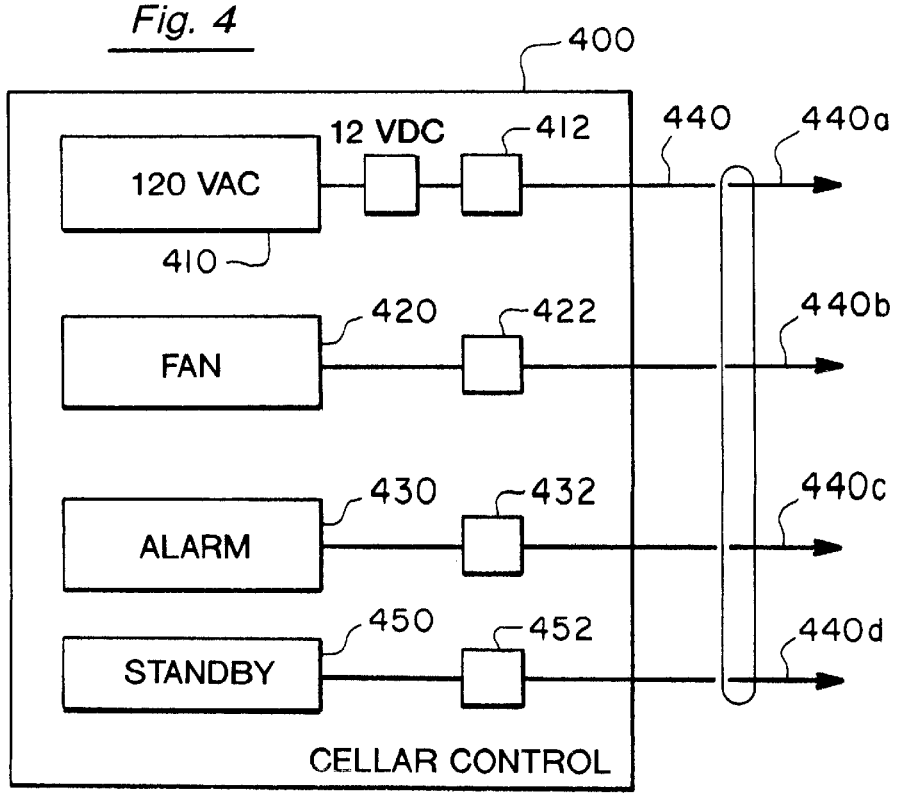

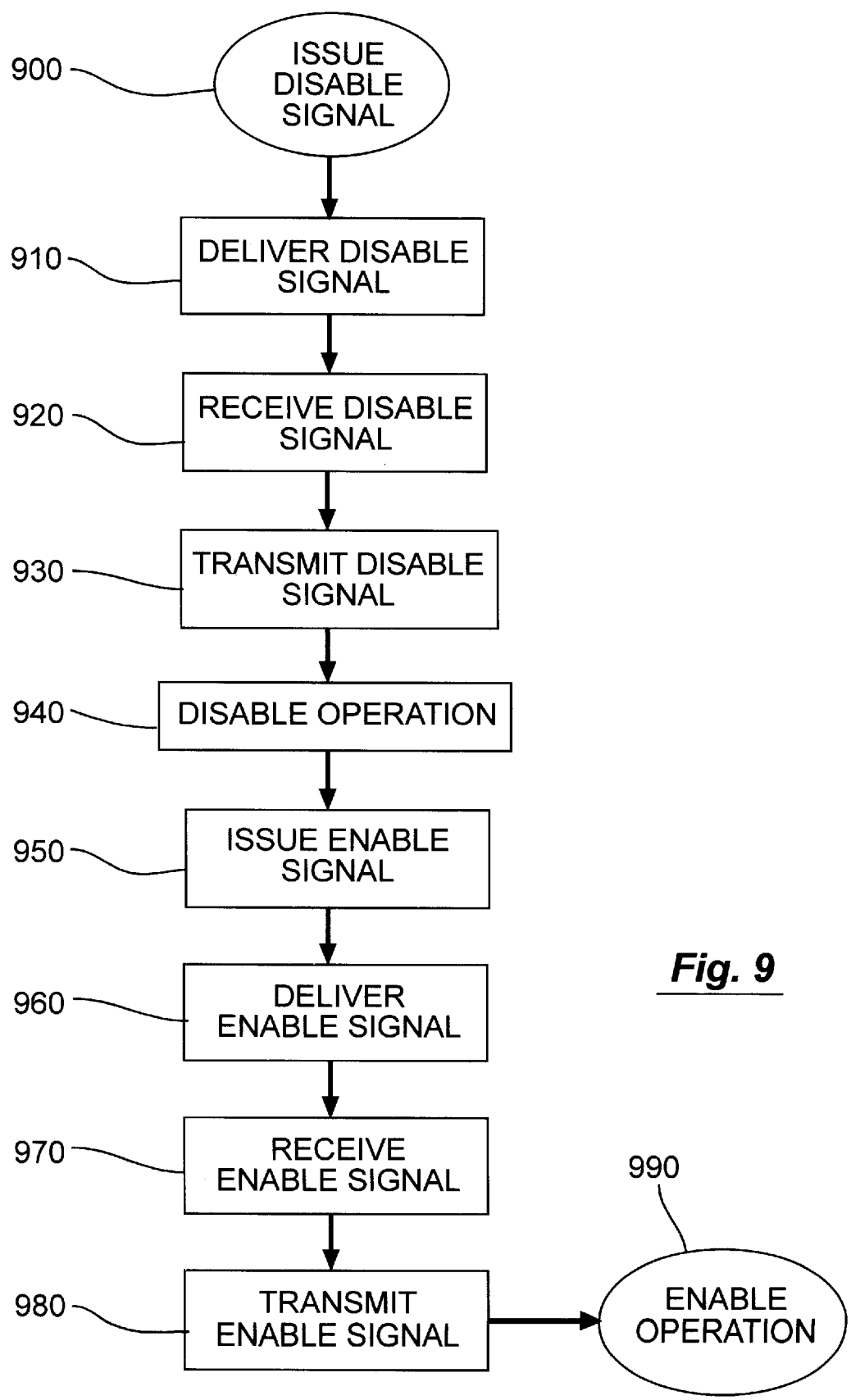

SYSTEM FOR CONTROLLING AND MONITORING AGRICULTURAL FIELD EQUIPMENT AND METHOD

RELATED INVENTION

This application claims the benefit of "PivaTrac™ For Controlling and Monitoring Irrigation and Other Field Equipment Using Two-Way Radio Telemetry, Single Computers and Telephone Pagers," Disclosure Document No. 383437 filed Oct. 16, 1995, and claims the benefit of U.S. Provisional Application Ser. No. 60/030,272 filed Nov. 1, 1996.

BACKGROUND OF THE INVENTION

1. Field of the Invention

The invention relates to systems for controlling and monitoring agricultural field equipment such as irrigation pivots and potato storage cellars.

2. Statement of the Problem

A need exists to provide two-way remote communication between agriculture field equipment such as pivot irrigation systems and a mobile operator such as a farmer in a truck to report the status of the equipment and to provide command control over it. This is especially true when a farmer (or pivot irrigator) manages a large number of pivots (e.g., with a 20-mile radius). Pivot irrigation systems require frequent setup changes in response to weather changes, and since breakdowns are common, to confirm that they are running. While many conventional systems provide a central control computer (or base station) to report on the status of the equipment and to execute command signals, a need exists to immediately provide similar information to a mobile operator (such as a farmer in a truck) remote from the central control computer.

A number of prior patented approaches exist in the pivot irrigation technology. U.S. Pat. No. 4,396,149 (Hirsch) discloses an irrigation control apparatus using soil moisture sensors connected to a radio transmission apparatus located on the upper portion of the irrigation mast for continuously transmitting data concerning the status of soil moisture. A farmer obtains reports from a telephone or radio. The data from the moisture sensors (or a weather station) are delivered to a remote computer such as through radio transmission, which processes the data and in turn communicates it to the farmer.

U.S. Pat. No. 4,899,934 issued to Krisle sets forth a sensor on a pivot irrigation system for monitoring stoppage of the pivots. When stoppage is detected, a radio transmitter at the pivot delivers a signal to a remote receiver or beeper carried by the farmer. When stoppage of the pivot or angular displacement of sections of the pivot occurs, a signal is generated which is delivered to a radio transmitter at the pivot for transmitting a signal to a detached signal receiver or beeper carried by the farmer.

U.S. Pat. No. 4,856,047 issued to Saunders teaches an automated remote telemetry paging system where operators carrying remote pagers are notified of alarms at a specific site location. The operator carrying the pager can take appropriate repair or corrective action to remedy the alarm situation. In the '047 patent, the status of the monitored functions is continuously monitored every 26 microseconds. The input status values are compared against a reference field stored in memory and if a deviation occurs, an alarm is issued to the remote pager identifying the location with the alarm.

U.S. Pat. No. 4,962,522 issued to Marian provides a pager at each pivot to receive command signals from a remote phone to control activities at the pivot. A farmer at a phone in a vehicle calls a paging station and enters an identification code and a message. The message is delivered to the pager at the irrigation site, is decoded, and causes a function to occur at the site (such as to increase watering or to decrease watering).

U.S. Pat. No. 5,255,857 issued to Hunt sets forth use of a master control computer at each pivot, which communicates to a central computer. The central computer monitors the pivot and allows the operator to program the system. The computer at the pivot may be controlled by a radio device such as a VHF transmitter or a cellular telephone system. Hunt provides an operational personal computer-based irrigation network facility so as to provide complete irrigation management. This allows management from any location on the farm or elsewhere. The personal computer displays the current status of all pivots in the network and allows any settings to be changed.

U.S. Pat. No. 4,626,984 issued to Unruh discloses a central computer for monitoring control in a number of pivots. In an alternate embodiment of Unruh, a portable base unit could be separately transported by the farmer to input and monitor each intelligent remote unit. Hence, a farmer can, through a portable base unit, directly control and monitor the intelligent remote control at a pivot or pivots.

U.S. Pat. No. 5,146,216 to DeLuca et al., permits a pager to receive a graphic address command to display on the pager a desired graphic.

A number of prior commercially available systems for managing irrigation pivots are also available. Valmont Industries, Inc. sells a computer-aided management system, which includes a radio telemetry package, located at the irrigation pivot to provide two-way communication via a radio link to a remote central computer. The remote central computer enables the farmer to change all system operations from his office. Up to 100 pivots operate from one remote computer. The remote computer is interrogated by the central computer to obtain status changes for direction, running condition (run/stop), speed, water depth, and whether chemical is being applied. Communication range is a line of sight communication up to 15 miles and provides monitoring and control 24 hours per day. In the case of an alarm, an auto-dialer for the farm's two-way radio can be used to alert remote individuals. Valmont offers the Valley Remote Link which provides 24 hour control via a cellular phone, business band radio, or touch-tone phone. This allows the farmer to direct pivot functions from a remote location.

Lockwood Corporation provides an automated panel located at each pivot to allow the user to have computerized control over a particular pivot. When something goes wrong with a pivot, the Lockwood system will attempt to correct the problem at the remote central control and if unable to correct it, it will call a preprogrammed list of numbers until the farmer is reached.

T-L Irrigation Company provides a computer control for a hydrostatic drive pivot.

Reinke Manufacturing Company provides an automated management system having control panels at each pivot which may communicate with a remote computer control via a radio link.

Lindsey Manufacturing Company provides an automated irrigation management system which provides remote control and monitoring via a telemetry network with corresponding controls at each pivot. Lindsey provides a remote monitor alarm and control system that links the farmer with a pivot over the business band radio or cellular phone. It permits the farmer to poll any pivot and to provide the farmer with an instant report of operating conditions including an automatic trouble alarm. The farmer can start, stop, change direction and perform other control functions from the remote location. This system utilizes a UHF or VHF business band radio. A code is keyed on the microphone tone pad of the business band radio or cell phone. A code is keyed on the microphone tone pad of the business band radio telephone. This is received at the pivot and the pivot will respond with its call letters and unit number. The farmer then keys in the proper code to bring up one of hundreds of voice message combinations to obtain the exact operating status of the pivot system. These are status reports. The remote monitor alarm system will also automatically broadcast alarm messages such as when the pump shuts down prematurely.

Sensing and Control, Inc. also provides a computerized control at each pivot. However, a communications package provides communications to a remote central computer via a spread spectrum radio or telephone modem.

K&S Systems, Inc. provides a control display panel at each pivot and a two-way radio communications system link with a remote computer command system.

Dexter Fortson Associates, Inc. provides a control panel at each pivot. The control panel upon detecting a change in status immediately reports this to a remote base station. The base station computer can be set up to request updates such as every ten minutes from each control panel. The system interfaces with hand-held computer and telephone voice or digital to multi-frequency (DTMF) tone pad interface units to enable the farmer to monitor and control functions from vehicles, tractors, or homes within the radio range or from any touch tone telephone.

A need exists to provide a pager at the central control computer to receive remote commands from a mobile farmer to perform a function at an individual pivot managed by the central control computer. After the remote commands are performed, a need exists to provide feedback verifying the completion of the function to the farmer in the form of status signals displayed in a pager held by the farmer. Finally, a need exists for the farmer to be immediately paged whenever a change in the status of any one pivot occurs and to be updated on the status of all pivots with changes in status clearly marked. The Hirsch, Hunt and Unruh patents and the Valmont, Lockwood, Lindsey, and Dexter systems all teach providing a computer at each pivot in communication with a central computer and a portable unit (phone, radio, or computer) carried by the farmer for communication to the computer at the pivot, or in the case of Dexter, to the central computer. Saunders and Krisle teach providing equipment at the pivot for directly reporting status information to a pager carried by a farmer. Marian teaches sending commands from a phone carried by a farmer to a pager at the remote pivot. However, none of these approaches provide a solution to all of the above three needs.

A need also exists to continuously monitor the status of the AC power being delivered to each pivot, to continuously monitor whether each pivot is dry or wet, to monitor whether a pivot is moving or not, and to monitor the status of fertilizer and chemical injection equipment being operated at a pivot site.

A need further exists to issue a status signal when the central control computer has not communicated with a pivot for a predetermined period of time.

A need also exists to monitor the status of the "AC power interruption device" often used by rural power providers to "load manage" their power distribution systems. Running pivots are "shed" for periods of time in order to reduce power consumption at peak periods. There is a need to alert irrigators to these status changes, particularly to advise when power interruption is curtailed.

A need also exists to permit the farmer at a remote mobile location to control the pivot by "killing" a particular pivot by stopping the pivot from moving and delivering water. For example, when a thunder and lighting storm is nearby a pivot, it is often desirable to stop the operation of the pivot and the need exists for a kill control to remotely stop the pivot from operation.

A need also exists to have the farmer review all paged statuses for all pivots delivered to the pager during a past predetermined number of page transmissions.

A need also exists for the continuous updating of time and date stamped records of each monitored pivot's status to the central computer. These data base records are to facilitate the reporting of text and graphic reports of changes to pivot status over time. Selected summary reports can also be "paged."

In addition to pivot management, there is a similar need to remotely monitor status and control process functions of grain and produce conditioning and storage facilities such as potato cellars. These facilities are often scattered and remote to the central headquarters of a farm operation. Knowing the status of the ventilation, drying, and stirring equipment is critical to establishing and maintaining the optimal environmental conditions for stored crops.

3. Solution to the Problem

The system of the present invention for controlling and monitoring agricultural and storage field equipment provides a solution to all of the above-described needs. The system of the present invention provides a pager at a central control to receive remote commands from any of a plurality of mobile farmers in order to enable a function to occur at an individual pivot monitored by the central control. The performance of the commanded function is detected at the pivot and delivered back to the central control in the form of a status value. The change in status at the commanded pivot is then converted to a status "symbol" and delivered along with the status of all of the other pivots to the respective farmer via a hand-held pager that the farmer can clearly view. The pivot having the change (or the pivots having the changes) are clearly marked so that the farmer can instantly verify, in real time, the change in status as well as the status of all other pivots. Hence, with each page, the status of all pivots is delivered to the farmer at a remote location. Those pivots having a change in status are clearly marked. The farmer can, by viewing his pager, continuously monitor whether each pivot in the group of observed pivots is wet or dry or is moving or not or has lost AC power or has been "load shed" or is receiving chemical or fertilizer injection. Furthermore, the system of the present invention issues a status signal when the central control computer has not communicated with a pivot for a predetermined period of time (such as 45 minutes). The farmer needs to know of a failure in communication link at any pivot.

Furthermore, the system of the present invention enables the farmer at the remote location to control certain functions of the pivot such as "killing" a particular pivot by stopping the pivot from moving and delivering water, such as when a nearby thunderstorm or heavy rainstorm occurs.

Finally, the system provides storage in the pager at the farmer's remote location of a predetermined number of prior pages to enable the farmer to scan through such prior pages to review time tracked changes in status that have occurred in the past. The system provides a complete backup of status information and of all pages delivered and received for each piece of field equipment at the central computer.

SUMMARY OF THE INVENTION

A pager method system for monitoring the operation of a plurality of controllers in each one of a plurality of agricultural field equipment (i.e., a group) is disclosed. The pager method system of the present invention includes a plurality of isolation devices at each location of agricultural field equipment, such isolation relay devices providing optical isolation between the relay and the sensors and between the relay and the electronic circuitry of RTU 50. A plurality of sensors are provided at each location of agricultural field equipment wherein a sensor connects through an isolation relay device to one of the controllers for issuing a status signal corresponding to the present status of the connected controller. For example, in the case of pivot irrigation equipment, a power sensor could be interconnected through an isolation device such as an optical isolator to wet/dry control switch. The sensor continuously monitors whether or not the wet/dry switch is on or off through the optical isolation relay device.

The sensors of the present invention are interconnected to a remote terminal unit. Whenever the status of a controller changes, the remote terminal unit transmits the changed status symbol as well as the status of the other sensors to a central control computer. The "inputs" to the remote terminal unit include appropriate time delays to prevent the reporting of intermittent or "spike" signals.

The central control computer receives the transmitted status signals from the transmitting remote terminal unit, identifies the field unit and the data with a defined group, and analyzes the status signals for generating at least one changed status paging message for the respective group of equipment. In noisy environments, several redundant messages are sent. The central control computer delivers the changed status paging message, identifying the group and the agricultural field equipment having the changed status, as well as the unchanged status messages from all remaining agricultural field equipment in the respective group. The changed status and the unchanged status paging messages are delivered to a paging terminal for redelivery to a pager (or group of pagers) held by an operator of the defined group of equipment at a remote location. The pager notifies the operator of the page, and the operator views the displayed changed and unchanged status paging message. The pivot(s) with changed status is marked so that the operator can easily identify which piece of agricultural field equipment had its status changed for the current page.

The method of the present invention for monitoring the operation of a number of controllers and for commanding the operation of at least one power circuit in each one of the plurality of agricultural field equipment includes the following steps:

issuing a command signal for an identified agricultural field equipment in an identified group from a phone at a remote location, delivering the issued commands by way of commercial paging services to a first pager located at a central control computer, the central control computer transmitting by way of radio telemetry the delivered command signal to the power circuit (or other control points) at the identified agricultural field equipment, commanding the operation of the power circuit at the identified agricultural field equipment, issuing status signals corresponding to the changed and unchanged status of the plurality of controllers, transmitting the issued status signals by radio telemetry to a central control computer whenever one status signal changes such as in response to the commanded operation, receiving the transmitted status signals at the central control computer, analyzing the received status signals at the central control computer, generating a changed status paging message identifying the location and status of the agricultural field equipment having the one status signal change and including the unchanged status of the remaining agricultural field equipment locations in the group, delivering the paging message to a second pager carried by a remote operator by way of commercial paging services, displaying said changed and unchanged status paging message in the operator's pager, the changed status paging message being marked when displayed thereby marking the agricultural field equipment issuing the changed status paging message.

The same sequence of system events is carried out when an individual pivot has a change in status of a monitored input (event). The status signals corresponding to the changed and unchanged status of a plurality of controllers are immediately transmitted to the central computer so as to cause a new page message to the operator's pager displaying the changed and unchanged status of all pivots in the respective group.

The method of the present invention for monitoring the operation of a number of controllers also includes a means for each remote terminal unit to transmit a "self report" of current status of all inputs (control points being monitored) to the central computer. Such self reports provide a "backup" to any missed "event" reports. The frequency of self reports is adjustable. Self reports also verify continued radio functions.

BRIEF DESCRIPTION OF THE DRAWING

FIG. 1 is an illustration showing the various major components of the system of the present invention and their communication paths.

FIG. 3 is the screen presentation at the central control computer for defining a group.

FIG. 4 is a block diagram of the potato cellar control of the present invention.

FIG. 9 is a flow chart illustrating a method to disable/enable an auto restart controller in the agricultural field equipment.

DETAILED DESCRIPTION OF THE INVENTION

1. Overview

Figure 2:
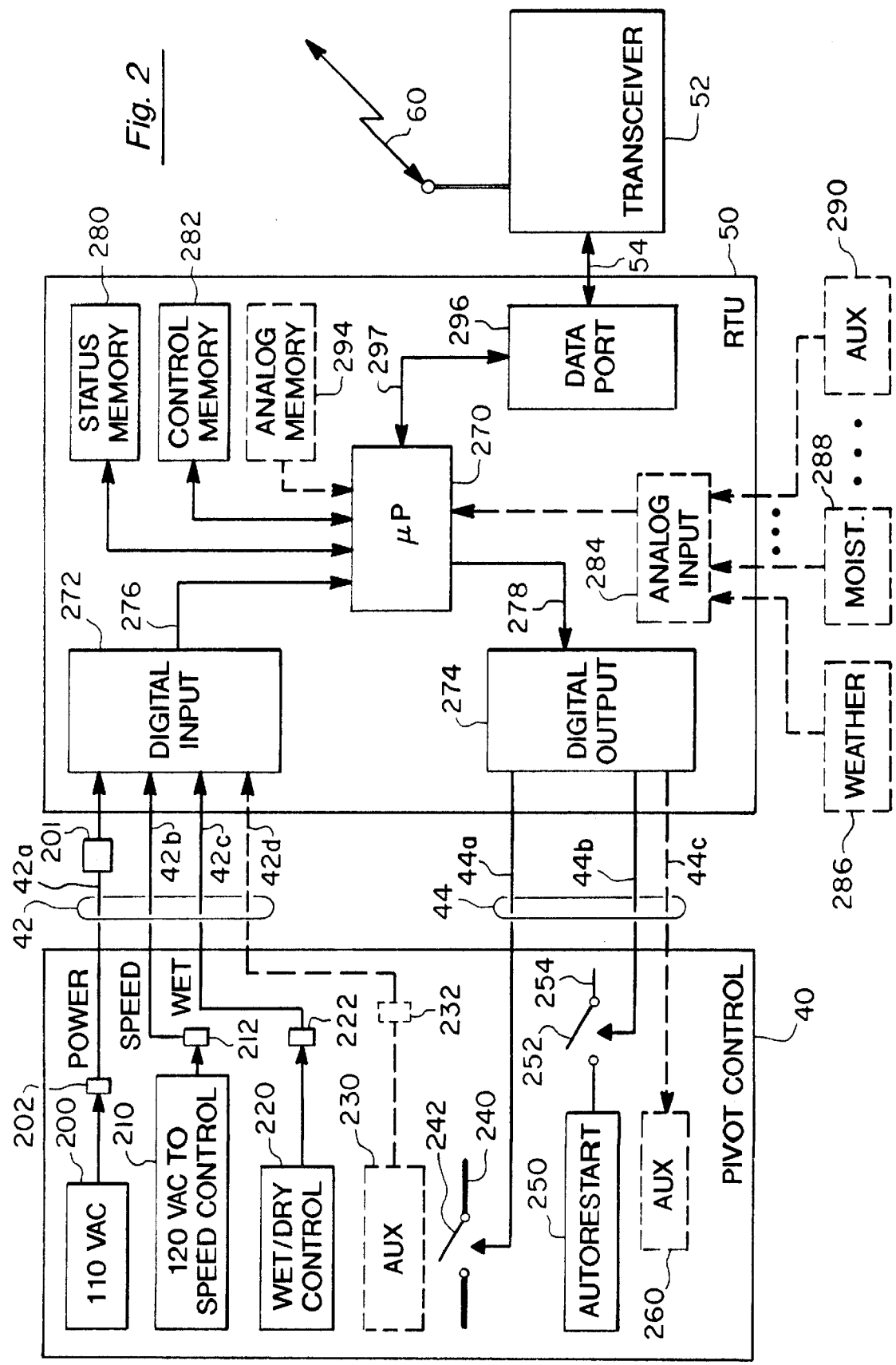
FIG. 2 is a block diagram of the remote terminal unit of the present invention at a conventional pivot.

In FIG. 1, the system 10 of the present invention is generally shown. A center irrigation pivot 20 operates in a field 30. Such pivot irrigation systems 20 are conventionally available from a number of sources. Pivots 20 are typically under control of control circuits 40 which control direction of the pivot, the rate of application (i.e., the speed by which the pivot 20 moves over the ground 30), whether chemicals such as fertilizer are to be added, and other operational parameters. It is to be expressly understood that the pivot control 40 and the pivot 20 in operation on a field 30 is conventional.

The present invention interfaces with a remote terminal unit (RTU) 50 which provides a radio link 60 to a transceiver 70 at a central location 80. The transceiver 70 is connected to a central computer 90 by means of a conventional radio modem (not shown) and provides a two-way communication link 60 between the central control computer 90 and the remote terminal unit 50. The central control computer 90 can receive status signals from the RTU 50 concerning the status of the various operational parameters of the pivot 20 and can deliver control signals from the central control computer 90 over the link 60 to the RTU 50 for controlling certain operational functions of the pivot 20. Again, the provision of a RTU 50 with the capabilities of two-way transmission 60 to a central control computer 90 is conventional and can be found in, for example, the Valmont system discussed above. However, under the teachings of the present invention and as will be explained later, particular status signals and control signals are provided and delivered over the two-way communication link 60 in accordance with the teachings of the present invention.

Central control computer 90, under the teachings of the present invention, is capable of establishing a communication link 100 to an alpha port paging terminal 110 through a telephone modem (not shown). The communication link 100 may be a standard telephony link over phone lines connected to the central control computer 90. Again, communication path 100 and paging terminal 110 are conventional. The paging terminal 110 transmits a paging signal 120 which is received by a pager 130 at a remote location 140. Remote location 140 could be a truck moving along a road many miles away from locations 30 and 80. This communication link 120, under the teachings of the present invention, delivers the current status of all pivots 20 in a defined group, when a status of any one pivot in the group has changed, and displays 132 all the statuses of the group in the pager 130.

Under the teachings of the present invention, a cellular or touch-tone phone 150 is used to transmit control signals over a communication link 160 which is delivered through conventional telephony channels to the paging terminal 110 for retransmission as paging signal 170 to the control pager 180 located at the central control computer 90. The control pager 180 has a serial connection 190 to the central control computer 90.

Figure 7:
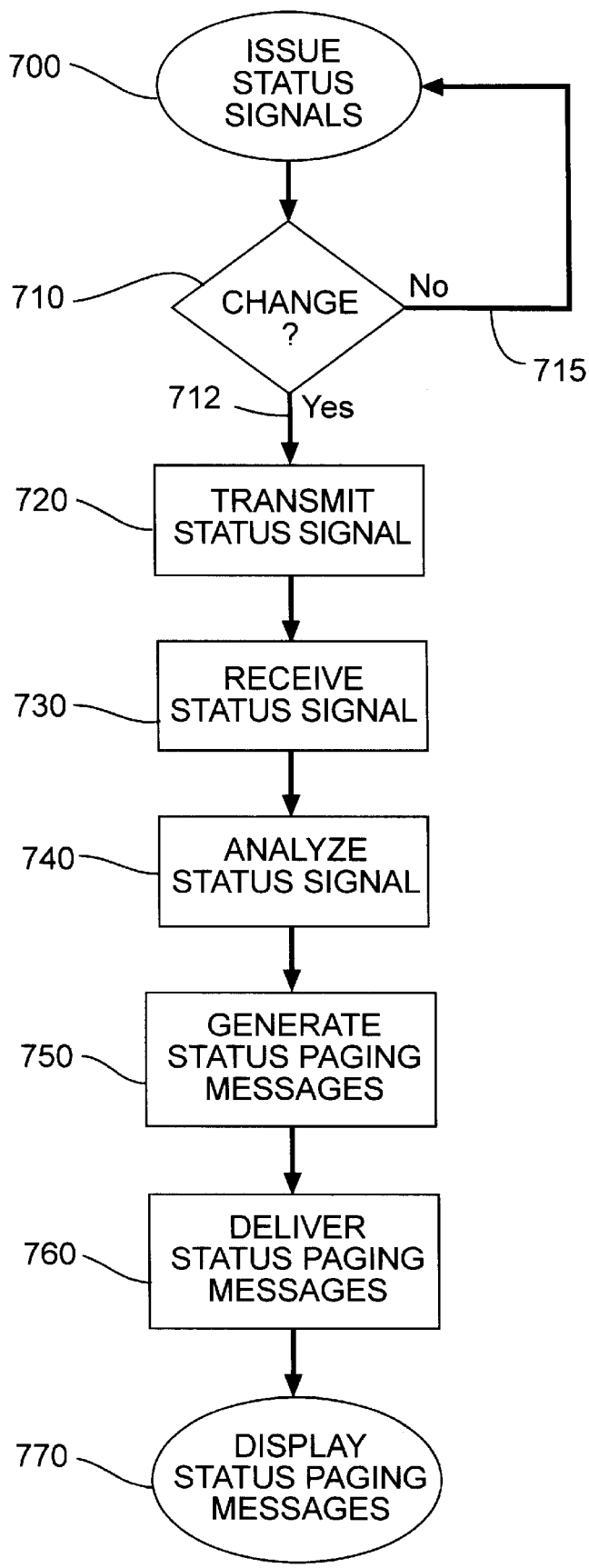
FIG. 7 is a flow chart illustrating a method to issue status messages to a pager.

In operation, as illustrated in FIG. 7, and assuming there are three center pivots 20 (only one of which is shown in FIG. 1), the RTU 50 continuously monitors in steps 700, 710 and 715 the status of select operational parameters on the pivot 20. These status signals are delivered in step 700 through the communication channel 60 into the transceiver 70 for processing by the central control computer 90. Whenever a monitored input has a change in status (e.g., off to on) 712 the RTU immediately sends a "data packet" of all monitored status to the computer 90 in steps 720 and 730. When the central control computer 90 detects a change in the status of one pivot in step 740, computer 90 assembles the status signals of all units in the group of three in step 750 and delivers all of them in a group as a page message over the communication link 100 marking the unit that has changed in step 760. Also in step 760, the paging terminal 110, in turn, redelivers the status signals as a page over communication links 120 to the remote pager 130 and displays 770 them as a page message in the display 132.

For example, in FIG. 1. "01s" in the display 132 indicates to the operator of the pager 130 that pivot "01" is in a standby (or "stopped") mode "s." The pager display 132 also indicates to the holder of pager 130 that the second pivot "02" is wet "w" indicating it is moving and sprinkling the field 30 and that the third pivot "03w" is also in the wet status stage. The parenthesis ( ) around "03w" indicates to the operator that the status of pivot 3 just changed and was the cause of the current page message.

Under the teachings of the present invention, the status of all pivots in a defined group are delivered in the paging signal to the pager 130 whenever the status of one pivot in the respective group changes. The system of the present invention can handle any number of pivots in a small group although the preferred number is up to 30. Multiple groups for one irrigator are provided, enabling hundreds of pivots to be monitored on a single pager. The system also provides for any one pivot status to be simultaneously sent as part of multiple groups to multiple pagers carried by different individuals. The various types and forms of status signals being determined and sent will be explained in the ensuing.

Figure 8:
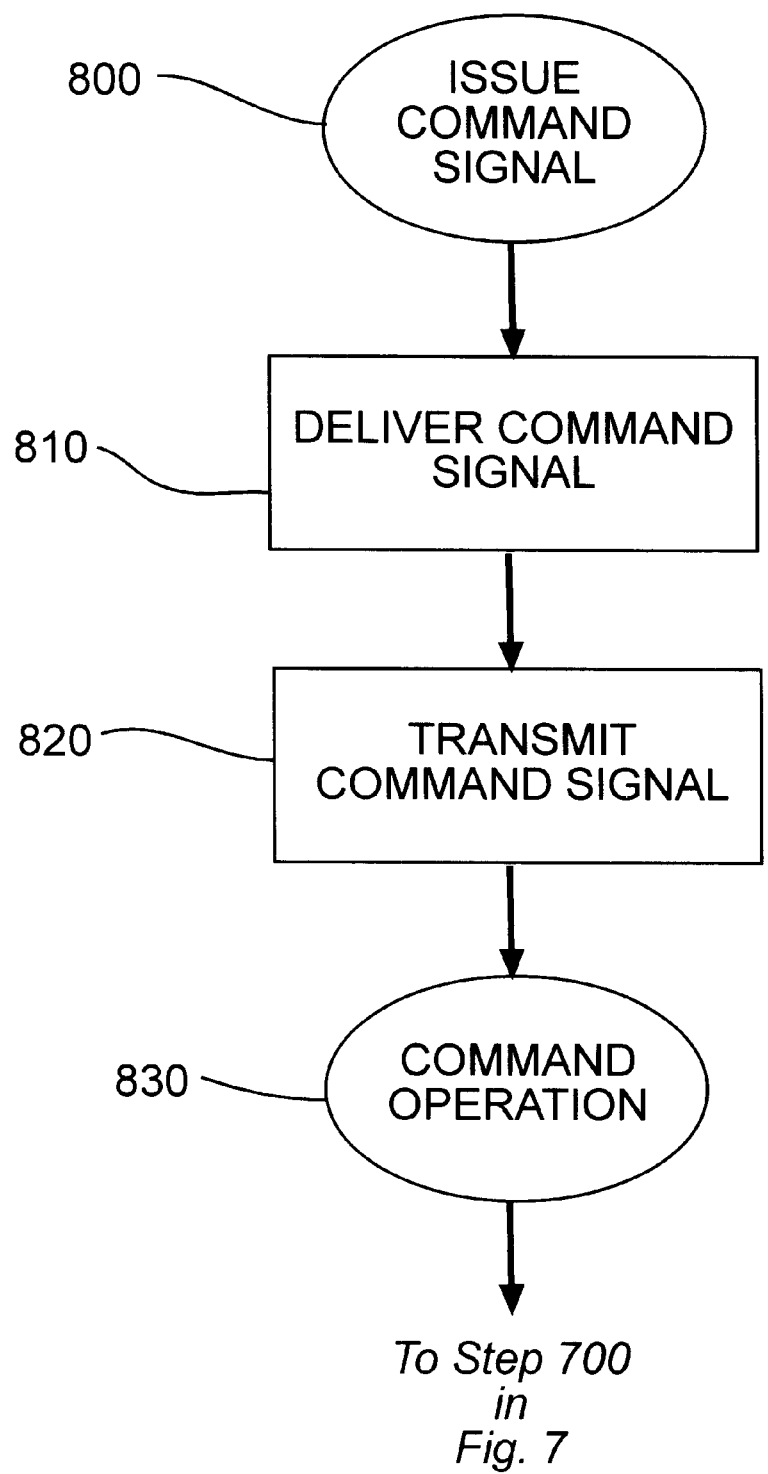
FIG. 8 is a flow chart illustrating a method to command operation of a power circuit in the agricultural field equipment.

As shown in FIG. 8, the operator of the pager 130 can use a cellular phone 150 or touch-tone telephone to issue a command signa in step 800 by conventionally calling the paging terminal 110 and to deliver 810 a coded page message over communication link 170 to control pager 180. The central control computer 90 upon receiving a page from control pager 180 over interface 190 processes the paged control commands and delivers 820 them over communication link 60 to the RTU 50 to cause the pivot control 40 to perform the requested operational functions in step 830.

The operator of the pager 130 can thereupon observe the performance of the function since the actual performance of the function commanded will be detected by the RTU 50 and delivered back to the pager 130 in the manner described above with respect to FIG. 7 to show the changed status of that particular pivot. For example, a pivot can go from the "s" standby status to the "w" wet status with the farmer issuing a control command to start the pivot from any cell phone or touch-tone telephone.

Under the teachings of the present invention and without traveling to the field 30, an operator of the present invention at a remote location 140 can view the status of any pivots and can effectuate changes in the status of any pivot in the group and then have feedback verifying the occurrence of the change.

For example, should a storm suddenly appear or approach the field 30, the farmer can cause the pivot 20 to shut down until the storm passes to avoid possible lightning damage to the pivot 20 or its control 40 or an over-application of water in case of a large rain.

It is to be expressly understood that the pivot 20 comprises agricultural field equipment, but that the agricultural field equipment may also include other types of irrigation systems or, for example, equipment for storing crops such as potato cellars or grain bins.

The present invention combines the use of a central control computer 90, telephone pagers 130 and 180, cell phone 150 (or touch-tone telephone), and two-way telemetry 60 to remotely control equipment functions and to record in real-time the status of the equipment and/or other field sensors among a plurality of remote locations such that certain changes in the operating status of remote equipment (e.g., pivots 20) or sensor readings being monitored are immediately and automatically reported to the operators by means of standard text pagers carried by the operators. The system of the present invention recognizes and records status changes in the field equipment 20 received by the central control computer 90 over the radio or telemetry 60 from individual RTUs 50 each monitoring inputs (either digital or analog or both) that define the operation of the field equipment.

The system automatically creates discreetly addressed (group and unit I.D.) "data packets" of the status signals for each piece of field equipment (i.e., each pivot 20) in a defined "group" (such as, for example, 30 pivots) using specific "protocols" acceptable to a paging terminal 110. Each pivot can be assigned to any of a plurality of groups such that the status change of a single pivot is reported in a plurality of groups and in turn paged to multiple pagers. The system of the present invention provides an automatic connection and communication of these "data packets" through a modem and over telephony lines 100 from the central control computer 90 to one or more paging terminals 110 which in turn automatically transmits the "data packet" containing the status signals to the individual operator's pager 130. Each change in status on a single piece (e.g., pivot 20) of monitored equipment in a defined group results in an immediate and complete report being sent to the pager 130 of the status of monitored set points of all field equipment in the respective group of field equipment.

The operator, at the remote location, can use standard touch tone telephones 150 to dial into the paging terminal 110 and enter passwords, equipment ID numbers and discrete digital commands to change the function of a discrete piece of remote field equipment (i.e., pivot 20) either immediately or to be performed at a future time. The operator can also create and store date and time page messages on any PC computer and use a phone modem connection to automatically send a controlled "data packet" to the paging terminal 110 immediately or at a future date and time. Upon receipt of the "data packet" (from either a touch tone phone or a computer and phone modem), the paging terminal 110 transmits the digital command "data packet" to the "control pager" 180 at the central control computer 90. The "data packet" received by the pager at the central control computer site 80 is automatically delivered 190 to the central control computer 90 through a conventional serial port. As the "data packets" are received by the central control computer 90 from the control pager 180, a central control computer 90 verifies password, equipment ID numbers and control commands and retransmits the control command signals to the RTU 50 at the location 30 of the field equipment 20 over telemetry path 60.

Alternatively, the date and time can be assigned to the data packet, immediately downloaded to the "control pager" 180, and passed to the control computer 90, which will transmit the signal to the RTU 50 at a future time corresponding to the date and time included in the page message sent to the control pager 180, as will be subsequently discussed.

The present invention, upon execution of a remote control change to the operating function of the field equipment (for example, pivot 20 being turned "on to off" or "off to on"), causes the RTU 50 at the location 30 of the field equipment 20 to report the digital change "event" back to the central control computer 90 over the telemetry path 60. The central control computer 90, in turn, keys up a phone modem connection over path 100 and automatically dials the paging terminal 110 and transmits a "data packet" of the new status. In turn the paging terminal 110 automatically transmits a page message reporting the new "data packet" on the respective piece of field equipment 20 as well as the latest status on all other pivots in the group to the operator's pager 130.

Thus the system of the present invention provides a "closed loop" between the execution of an on-site or remote control command and the reporting of the resulting equipment status changes to pagers 130 carried by those operators managing or executing the control changes. Via pager messages, the field equipment operators would have real-time status of the selected operating set points of digital inputs and values of any analog inputs for each field unit and for a group of field units.

While FIG. 1 shows a single pivot 20, single RTU 50, single control computer 80, single paging terminal 110, single pager 130, and single telephone 150, it is to be expressly understood that FIG. 1 is an illustration and does not limit the present invention. For example, a farming operation may have a large number of pivots 20 and RTUs 50 (e.g., 50 to 100), one or several computers 80, due to the geographical spread of the pivots 20, and a number of terminals 110, and a number or pagers 130 and phones 150 for each terminal 110 could be utilized.

2. Details of the Remote Terminal Unit (RTU) 50

In FIG. 2, the components of the remote terminal unit 50 are shown. The RTU 50 is connected to a transceiver 52 which issues the two-way radio signal 60. The RTU 50 is connected to the transceiver 52 over communications link 54. Transceivers 52 are conventionally available.

The RTU 50 is also connected to a pivot control 40 over status input lines 42 and control output lines 44 through isolation input circuits and control relays. The pivot control 40 can be any conventional pivot control apparatus such as those described in the background of prior art section.

a. Power Status Input

Each pivot control 40 has a source of control power 200 such as 120 VAC for powering the internal electromechanical or electronic control circuitry for the pivot control 40. The present invention provides a pick-off lead 42a and 12 VDC power supply 201 for converting the 120 VAC power to 12 VDC power and for sensing the presence of control power from the power source 200 through a battery charger 202. The RTU includes a battery charger 202 connected to a source of AC power 200 that continually powers a resident battery, not shown, in the RTU. When the source of control power fails, the twelve volt battery stops charging and pick-off lead 42a senses this occurrence.

b. Speed Status Input

In conventional control 40 there is also a circuit 210 that delivers power such as 120 VAC to the control relay of the drive circuit of the pivot 20 to cause it to move. In a typical pivot 20 operation, water is delivered at a constant rate and by varying the speed of the pivot 20, the water rate application can be varied. By providing a pick-off lead 42b from the 120 VAC circuit of a conventional "speed timer" to an optical isolator 212, the delivery of power to the speed timer can be sensed and the status of whether or not the pivot 20 is moving is known. Whether it is moving in the clockwise or the counterclockwise direction is not important.

c. Status Input

Also found in conventional pivot controls 40 is a wet/dry control circuit 220. The pivot control 40 has a circuit 220 that issues a signal to deliver water through the pivot 20 for delivery on the field 30. The present invention provides a pick-off line 42c acting through an optical isolator 222 for sensing when pivot control 40 operates to deliver water. For example, this could also sense a dry contact closure of a pressure switch actually in the water line to sense when water pressure is there.

d. Auxiliary Status Inputs

The present invention is not limited to the above status inputs, all of which are digital. Other digital status inputs from the pivot control 40 could be delivered through the auxiliary circuit (or circuits) 230. For example, whether the pivot 20 is moving in the forward or reverse direction could be determined, whether the pivot 20 has injection equipment adding chemicals, whether a corner gun on the pivot 20 has been extended, whether load management circuitry has been activated by a power provider, etc. could be additional status inputs. These additional digital inputs from one or more auxiliary circuits 230 are delivered through corresponding optical isolators and over lines 42d.

e. Kill Control Command

Likewise, the pivot control 40 can be controlled by the RTU 50 over control lines 44. At the pivot control 40 exists a conventional "safety" line 240. This safety line 240 is essentially a closed loop line that senses when any portion of the pivot 20 becomes out of alignment or the pivot stops moving, loses pressure, etc. For example wheels in a portion of the pivot 20 could become stuck causing misalignment of the pivot and a break in the closed loop safety line 240. This is discussed above, for example, in U.S. Pat. No. 4,899,934.

The present invention places a switch 242 in the safety line 240. When a "kill" control signal is delivered over control line 44a, the switch 242 opens. The opening of the safety line 240 causes the pivot control 40 in a conventional fashion to shut down. This turns off the power to the wheels of the pivot and typically opens the wet/dry control stopping the means of water delivery. Hence, switch 242 is normally closed in operation.

In operation, the farmer at location 140 can call the paging terminal 110 and key in a code for "kill." The paging terminal 110 delivers this "kill" code to pager 180 which, in turn, communicates the "kill" code to computer 90. Computer 90 thereupon issues a "kill" command from transceiver 70 over link 60 to transceiver 52 where it is delivered to RTU 50 and into memory 282. The microprocessor 270 causes the switch 242 to open for a predetermined period of time, such as five seconds, so as to open the safety line 240. The pivot 20 and water control are then stopped.

f. Power On/Off Output Command

Although not conventionally part of a pivot control 40 the operator of a pivot can add an auto restart circuit 250 to pivot control 40. The auto restart circuit 250 is used in the pivot 20 to detect main power interruptions. When a power interruption is detected in the main AC source of power to the pivot 20, circuit 250 conventionally operates to prevent power from reactivating the pivot control 40 for a predetermined period of time such as five to twenty minutes. An operator conventionally sets the predetermined time. Hence, when a power interruption such as a momentary loss of power long enough to "break the safety circuit" occurs, the pivot stops. This is detected on the AC power line to the auto restart device 250, and the auto restart circuit 250 will prevent the redelivery of restart control power back to the pivot 20 for a sufficiently long period of time to prevent damage to the pivots such as providing enough time for the water to drain from the pump column or line pipes and pivot so as to prevent hydrostatic pressure damage.

The present invention adds a switch 252 in the sensing line 254 of the auto restart circuit 250 to fake a power outage by opening solid state switch 252 and a moment later reclosing switch 252. When this open-and-close sequence is executed on a pivot in standby mode "s," the auto restart circuit 250 will restart the pivot as if a power interruption had occurred. Switch 252 is under control of control line 44b. Under the teachings of the present invention, a control signal on line 44b opens switch 252 which emulates a power interruption to the auto restart circuit 250. It is to be understood that the placement of switch 252 does not interrupt the power to the pivot control 40 or to the pivot 20 and that only the power in the line 254 to the conventional auto restart circuit 250 is interrupted. Hence when switch 252 is opened, the auto restart circuit 250 is deactivated though main power to the rest of the pivot 20 is still being delivered. When the switch is closed (activated), the restart process as controlled by the auto restart circuit 250 is started. If the pivot is already running the command is moot. If the pivot is in standby mode, it will start and run. Control of switch 252 provides a means to not only remotely initiate an auto restart, but also a means of remotely "deactivating" the function of the auto restart circuit 250 by latching the switch "open." This would be beneficial during a period of multiple main power interruptions such as result during lightning storms, because repeated start/stop operation of a pivot experiencing multiple power interruptions could be avoided. Short periods of on/off operation of a turbine pump in a well can greatly increase the amount of sand or gravel drawn into the well casing.

The remote control of an auto restart circuit 250 located in farm field equipment is an important feature of the present invention, as shown in FIG. 9. For the reasons stated above, farmers and operators are reluctant to install auto restart circuits 250 into their field equipment such as pivots because of the continuous starting and stopping of the field equipment during a thunder and lightning storm. This command feature of the present invention enables a farmer to issue a disable signal from his remote location in step 900, which is delivered to the pager 180 located at the central control computer 90 in step 910. The central control computer 90 receives the disable signal in step 920 and transmits 70 it to the RTU 50 in step 930 to disable the auto restart circuit 250 in step 940, as discussed above. The farmer can simply leave the auto restart circuit 250 disabled during the thunder and lightning storm and then issue an enable signal from the remote location to enable the auto restart circuit 250 in steps 950 to 990 similarly to that discussed above with respect to disabling the auto restart circuit 250. It is important, once again, to underscore that disabling the auto restart circuit 250 does not affect the operation of the pivot 20 as discussed above. What it prevents is the operation of the auto restart circuit 250 numerous times during a thunder and lightning storm which would, in fact, affect the operation of the pivot 20 and perhaps cause damage such as increasing the amount of sand or gravel drawn into the well casing.

g. Auxiliary Outputs

It is to be expressly understood that other control signals could be delivered over additional control leads such as 44c to control other auxiliary functions 260 of the pivot control 40.

In FIG. 2, the RTU 50 has a microprocessor 270, a digital input circuit 272 and a digital output circuit 274. The digital input circuit 272 communicates with the microprocessor 270 over lines 276 and the digital output circuit 274 communicates with the microprocessor over lines 278. Also found in the RTU 50 is a status memory 280 and a control memory 282. The microprocessor 270 periodically reads the status signals on status inputs 42 from the digital input circuit 272 and stores them in a status memory 280. Likewise, the microprocessor 270 stores control functions in the control memory 282 for delivery over line 278 through the digital output circuit 274 and over control lines 44 to the pivot control 40.

Also shown in FIG. 2 is an optional analog input circuit 284 which can receive various analog inputs from analog sensors 286, 288 and 290. For example, various analog inputs could be derived at by sensors 286 such as temperature, humidity, or wind speed and direction. Analog sensors 288 could sense the temperature and moisture in the soil and other auxiliary analog inputs from circuits 290 could be delivered through the analog input circuit 284 to the microprocessor. These could be stored digitally in the analog memory 294 by the microprocessor 270. Additional signal conditioning of analog instruments could include cumulators, prescalers and counters to measure water flow, rainfall, wind speed, etc. The data associated with these sensors and other input devices could be sent to the control computer as an addendum to the "data packet" described above. The values of instruments and sensor readings could be processed by software at the central computer and delivered as alarms or as "mail drop" messages to the same pagers 130 carried by managers and operators for the purpose of monitoring equipment status.

Finally, there is a data port 296 which provides two-way communication 297 between the data port 296 and the microprocessor 270.

i. Future Commands

The command/status structure of the present invention enables its operator to program the performance of commands to occur in the future.

As discussed earlier, the farmer (or operator) can generate date and time controlled page messages from a personal computer and phone modem connection for delivery of a "data packet" to paging terminal 110. The farmer may also program central control computer 90 to execute a command at a predetermined date in the future. The central control computer 90, having a real time clock, will cause the command to be generated in transceiver 70 for delivery over link 60 to the RTU 50. The RTU 50 will cause the command to operate on the pivot 20. Hence, the farmer at the central control computer 90 could program the "kill" command, discussed above, to operate on a designated pivot 20 three days into the future at 1:00 p.m. The computer 90, upon sensing the real time clock, would cause the "kill" command to be delivered to the pivot 20 when the pre-set time actually occurs. Of course, the performance of this command will cause a status signal change to be immediately delivered by the RTU 50 back to the computer 90 which, in turn, will transmit a paging message marking the change in status for that pivot as well as providing the unchanged status signals for all other pivots in the group to the farmer.

Rather than actually go to the central control computer 90, the farmer can use the telephone 150 to key in a future preselected time at which to cause the command to be executed by the central control computer 90.

3. Central Computer

In FIG. 1, the central computer 90 receives the status signals from the RTU 50 over the transceiver connection 52 and 70 as shown by radio link 60. It is immaterial to the teachings of the present invention as to the protocols and design of the transceivers 52 and 70 and the nature of the data transmitted on link 60. Suffice to say that the RTU 50 periodically delivers from the status memory 280 the status of the signals appearing on lines 42. Likewise, in an optional environment, analog input signals can also be delivered from analog memory 294 to the central computer 90. The RTU 50 delivers the status periodically (such as every 15 minutes) to the central control computer 90 unless a change in status occurs whereupon an immediate delivery occurs. The microprocessor 270 in the RTU 50 accesses a real-time clock, not shown, to periodically transmit through data port 296 the statuses stored in memory 280. Any suitable time period such as five to 500 minutes could be used. Whenever a change occurs and holds for a five-second period on one of the leads 42, it serves as an interrupt causing the microprocessor 270 to immediately act on the change, to update memory 280, and to transmit the changed status (and the remaining unchanged statuses) from memory 280 through data port 296 to transceiver 52.

EXAMPLE

| | |
|---|---|
| 12:00 a.m. | Transmit status of signals on lines 42 as stored in memory 280. |
| 12.02 a.m. | Power status on lead 42a changes. Interrupt occurs, after 5-second continuous changed status on lead 42a, memory 280 updated and transmission occurs of changed and unchanged statuses. |
| 12:15 a.m. | Transmit status of signals on lines 42 as stored in memory 280. |

In the above example, the normal periodic transmission (self report) from the RTU 50 to the central control system is every fifteen minutes and is illustrated to occur at 12:00 a.m. and 12:15 a.m. However, two minutes after the 12:00 a.m. periodic transmission, the status on power line 42a suddenly changes, causing an interrupt to occur in the RTU 50. The interrupt is sensed by the microprocessor 270, which updates the status memory 280 and, if the updated status holds for 5 seconds, assembles a status message for immediate delivery through the data port 296 by means of the transceiver 52 to the central control computer 90. Then, at 12:15 the next periodic transmission occurs which, of course, includes the changed status signal on lead 42a. While this transmission protocol would seem to be redundant, it serves an important role under the teachings of the present invention. One purpose of the present invention is to immediately transmit information concerning the status change at the field equipment 20 to the remote operator at location 140. Each digital input event is recorded and the data packet is sent immediately, followed by three more redundant transmissions spaced randomly in time over 90 to 180 seconds. This provides a higher success of reporting status changes and, in the event of a "general" power outage affecting multiple pivots 20, provides a method of spacing repeated event reports to the control computer 90. Without multiple, randomly spaced event reports, a power outage would cause all remote units to report in the same few seconds, and some reports could be lost or scrambled due to interference and unavailable radio receivers. The 12:02 transmission accomplishes that. The periodic transmission is also important so that the central control computer 90 can continually maintain transmission capabilities with the RTU 50. As will be explained later, should that transmission characteristic fail for a predetermined number of times, the operator at location 140 will be immediately notified. In addition, it is possible that one or more of the transmissions from the RTU 50 to the central control computer 90 may not occur or may occur with errors in place. This is especially true in a region of interference, especially in stormy weather. If, for example, the 12:02 a.m. transmission was not properly received by the central control computer 90, then the next periodic transmission will carry the changed status information, which will then be processed by the central control computer 90. The RTU 50 also receives from the central control computer 90 control commands through transceiver 52 and data port 296 which are stored in control memory 282 for subsequent redelivery through the digital output 274 over lines 44 to the pivot control 40 to perform an operational function.

The central control computer 90 hardware is a standard computer and similar to that used in the Valmont system discussed above. The software implements the logical flow and analysis discussed herein for the system and method of the present invention.

The central control computer 90 receives the status inputs and generates status signals which are set forth in Table 1 below.

TABLE 1

PAGE ALPHA CHARACTERS

| STATUS SIGNALS | STATUS INPUT SIGNALS | | | |
|---|---|---|---|---|
| | POWER | SPEED | WET | AUX |
| p | OFF | OFF/ON | OFF/ON | OFF/ON |
| s | ON | OFF | OFF | OFF |
| d | ON | ON | OFF | OFF |
| m | ON | OFF | ON | OFF |
| w | ON | ON | ON | OFF |
| e | ON/OFF | OFF | OFF | ON |
| X | No radio response (50 min.) | | | | where p = pivot power off
s = pivot on standby
d = pivot on dry
w = pivot on wet
m = pivot off, water on
e = pivot off and load managed
x = no communication from pivot In the preferred embodiment, the RTU 50 transmits 60 new status input signals every 15 minutes. Immediately on receiving such transmissions, software in the central control computer 90 compares the reported status to the last reported status and, if different, processes the status input signals (i.e., power, speed, wet) according to the logic of Table 1 to product the page alpha characters defined in Table 1. If not different, no page message is assembled. The central control computer 90 maintains memory files on statuses reported. Central control computer 90 uses conventionally available software (FIELD VISION FOR WINDOWS manufactured by Automata, Inc., 16216 Brooks Road, Grass Valley, Calif.) to collect the status input signals from the transceiver 70 and uses custom software (PIVOTRAC, manufactured for PivoTrac, LLC, by Automata, Inc.) to process those signals according to the state table of Table 1. The PIVOTRAC software periodically scans the FIELD VISION database to detect changed status information. In turn, the PIVOTRAC software formats the data signals in page alpha characters of p, s, d, e, m, w, and x and into a proper paging format. The paging information is written to a specified "directory" in the storage disk of the PC for detection by SPAN•N software.

The present invention uses the conventional SPAN•N software developed by DCC, Inc., 10 Second Street, NE, Minneapolis, Minn. 55413, to send the page message. In the field 30, when the pivot 20 changes it status (based on the status input signals) a digital event occurs. The central control computer 90 puts this information together according to Table 1 for a group of pivots and sends the new data as a paging signal to the operator at the remote location 140 directly into the operator's pager 130. This allows the operator to monitor all pivots in the group even though the pivots are at different locations and even though only one pivot has experienced an "event." The central control computer 90 prepares a file based upon the following information: "Group" provides a file for the operator to list all pivots 20 that it desires to be sent in a group and to be included in a single page. For example, 30 pivots could be identified in a single group. "Sensor Time Out" is a field that the base station operator sets which in the preferred embodiment is 50 minutes. This is the upper limit of time allowed between communications between a pivot and the computer before an "x" code is assigned to that pivot's operating status. In the preferred embodiment, status signals in the central control computer 90 are updated every 15 minutes from each pivot 20. Should any one pivot not report for three successive updates (i.e., forty-five minutes), then five minutes later the Sensor Time Out value in the field will time out. This is a logical operation at the central control computer 90 and is given a status "alpha character" of "x".

FIG. 3 shows the fields of a page file which includes the group number, the sender's ID, the paging terminal service number, the pager ID, the maximum length of the page message and the maximum retries. Each pivot (RTU 50) is assigned to one or more groups. Each group has a pager ID number. RTUs 50 can be readily moved from one site to another and an internal cross reference table is changed to link the RTU 50 to a two-digit pivot number in a group. The customer name for the group is also provided. This data is used to create a "resolved" message in a file that is detected by the conventional Span•N paging software. These fields of information are needed by standard alpha ports (paging services) using conventional paging protocols. FIG. 3 is a computer screen 300 on the central control computer 90 and, as discussed above, can be selectively entered by means of the conventional keyboard or other input device. The central control computer 90 through a standard modem communicates the page message over link 100 to the paging terminal 110 for delivery into the operator's pager 130 at location 140 as shown in FIG. 1.

When a page is sent it includes all the pivots in one group and their status. The page is only sent when a change in status occurs. The pager shows the operator's name followed by all the pivots by the group and their status. An example of this is shown in Table 2 below:

TABLE 2

DISPLAY PAGER

05 Jerry Abts 01x 02w 03w 09s 25d (89p) 90s 99w
06 Jerry Abts 01x 02w 03w 09s 25d (89s) 90s 99w
07 Jerry Abts 01x 02w 03w (09w) 25d 89s 90s 99w This example shows that operator Jerry Abts in pager message "05" has eight pivots in this group. The first pivot number 01 shows that it has not communicated "x" either from the central control computer's 90 initial startup or from a time determined by the sensor time-out value in the station file field as shown in FIG. 3. Pivots 02, 03, and 99 show that they are all wet "w," meaning that the pivots are running and that the water is on. Pivots 09 and 90 are in the standby (or stopped) mode "s" and are not running. Pivot 25 is running dry "d." Pivot 89 is the pivot that caused the page denoted by the parentheses around it. It had an AC power loss "p." The ( ) marks the location of the pivot whose status has changed. In the case of a power outage, the system of the present invention will wait five minutes before allowing another status to be sent for that pivot and only if the status has changed. An exception to this would be another pivot in the same group changing, in which case, all the statuses for that group will be sent with the new pivot enclosed in parentheses. In the preferred embodiment, the central control computer 90 provides a user defined delay (1–5 minutes) between calls to paging services which allows for multiple page messages to be delivered to a paging service on a single dial-up call.

In Table 2 above, the operator subsequently receives page "06" which indicates that pivot 89 changed status from "p" to "s." Later, the operator Jerry Abts receives pager message "07" indicating that pivot "09" changed status from "s" to "w." The pager of the present invention is capable of storing up to 20 such messages, thereby enabling the operator to scroll through the earlier messages to quickly review the history of the status changes, the changed status messages being marked with ( ). All stored pages include date and time of the page.

The present invention allows for a maximum of thirty groups to be defined. Each group can have up to 30 pivots.

In an alternate embodiment, the system of the present invention would incorporate various "graphic" displays of status on a pager developed and programmed for this purpose. As an example, Motorola markets "Sports Trax™," a graphic screen pager that displays the status of a baseball game. The 1-½" square LCD screen used in this application would serve as a basis to develop a special graphic display of center pivot status. For pivots this could be nothing more than columns and rows of "Cheerios"-size circles. The pivots would be numbered and a "solid" circle would be on; a pivot not running would be displayed by an "open" circle. Additional status could be coded graphically or displayed alphanumerically on the "main" screen or "sub" screen(s). This will be discussed in more detail later.

4. Command Operation

Table 3 sets forth the command operation for a pivot:

TABLE 3

COMMANDS

| COMMAND | PIVOT FUNCTION | PAGETAP ™ PHONE COMMAND | RESULT |
|---|---|---|---|
| KILL | Open Safety Circuit 5 Seconds and close | 0 (Kill Pivot) | Pivot is Stopped |
| AUTO-START | Open Auto Restart Circuit 5 Seconds & Close Auto Restart Circuit | 1 (Open Switch & then Close Switch) | Pivot is Started (Need Auto Restart) |
| DISABLE AUTO RESTART | Open Auto Restart Circuit (latch open) | 2 (Open & Leave Open) | Disables Auto-Restart |
| RESEND | | 3 | Resend last page |

The operator uses the phone 150 in FIG. 1 to send a command signal to the pager 180 at the central control computer 90. The operator would first dial the number of pager 180 and the paging terminal 110 would answer and request a message. The operator would first touch-tone the identity of his group (PIN four to six digits) followed by the I.D. number (two digits) of the pivot to be commanded (e.g. "01"). The operator would then touch-tone the command to be performed (e.g. "0" for "kill"). The terminal 110 relays the paged command signal to pager 180 for delivery into the central control which, in turn, relays the command of "kill" to the identified RTU 50. The RTU 50 receives the "kill" command and opens a solid state switch 242 in FIG. 2 to functionally stop the pivot 20. The RTU 50 closes the switch 242 after five seconds. The pivot remains stopped.

When the operator inputs a PAGETAP™ phone command of "1," according to Table 3 and FIG. 2, this command is then delivered to the RTU 50, causing solid state switch 252 to open (thereby faking a power outage at the pivot and disabling the auto restart) and then to immediately (after 5 seconds) close. The closing of the solid state switch 252 enables the auto restart device and returns the pivot control 40 to its normal operation which, in this case, is the normal and conventional functioning of the auto restart circuit 250. Hence, after a predetermined period of time (e.g., up to 30 minutes), the pivot control 40 auto starts the pivot 20. Hence, if the pivot is stopped, the operator at a remote location can use the conventional auto restart circuit 250 and solid state switch 252 to start the pivot.

The central control computer 90 automatically performs the opening of solid switch state 252 by sending a first command to RTU 50 and the closing of solid state switch 252 by sending a second command a predetermined time later, such as ten seconds. It is important to keep in mind that, under the teachings of the present invention, power is always delivered to the pivot 20 but that PAGETAP™ phone command in Table 3 above for "1" starts the pivot by first opening and then closing switch 252. If the pivot was already running when a "1" command is sent, the pivot would continue to run and there would be no change in reported status and, therefore, no new page message. If the pivot was off when a "1" command was issued (and assuming the pivot was otherwise set in a proper mode to be auto restarted), the pivot would start and a new page would issue.

The next PAGETAP™ phone command in Table 3 above is "2," which simply causes the solid state switch 252 to open and stay open. This disables the automatic restart circuit. The disabling of the auto restart function will not affect the operation of the pivot. Hence, if the pivot is running, it stays on. If the pivot is off, it stays off. This is an important command, since if the remote operator wants to ensure that the pivot does not auto restart, such as when storm conditions with lightning exist, he dials in "2." To simply start the pivot again, he later dials in a "1."

The last PAGETAP™ command is a "3." This signals the computer to "re-send" the last page for the group. This command is useful if the page message is not properly received by the pager or an operator has reason to believe he has missed a page message.

5. Potato Cellar Embodiment

The present invention could also be used for other field equipment such as, for example, a potato cellar.

A potato cellar control is shown in FIG. 4. The potato cellar control 400 has a 120 volt AC power source 410 for controlling circuitry, a fan 420, and an alarm circuit 430. Again, these are all conventional control circuits found within a potato cellar ventilation system.

An optical isolator 412 is provided in the path sensing whether 12 volts DC is present from the power supply feeding off of the 120 VAC circuit 410. The sensing path 440 delivers the signal to an RTU such as RTU 50 in FIG. 2. Likewise, whether the fan 420 is operational is delivered through an optical isolator 422 and over lead 440b to the RTU 50. Finally, whether an alarm (typically a "red" light on the outside of the cellar) has been generated is delivered through an optical isolator 432 and over sensing line 440c to RTU 50.

Table 4 sets forth the assembly of the paging alpha characters by the central control computer 90.

TABLE 4

| STATUS SIGNALS | PAGE ALPHA CHARACTERS STATUS INPUT SIGNALS | | |
|---|---|---|---|
| | POWER | FAN | ALARM |
| p | OFF | OFF/ON | OFF/ON |
| s | ON | OFF | OFF |
| f | ON | ON | OFF |
| a | ON | ON | ON |
| a | ON | OFF | ON |
| x | No radio response (50 min.) | | | where p = cellar power off
s = cellar on standby
f = cellar fan on
a = alarm condition
x = no communication from cellar The operation of the potato cellar is similar to that of the pivot. As shown above in Table 4, the status input signals for power (on line 440a), fan (on line 440b), and alarm (on line 440c) are detected and delivered into the RTU 50. Periodically, such as every 15 minutes, these status input signals are, in turn, delivered to the central control computer 90. In addition, whenever a signal input changes from one state to the other, the three status input signals for power, fan and alarm are also sent to the central control computer 90.

The central control computer 90 then processes these three status input signals according to the logic of Table 4. The central control computer 90 generates the five alpha page characters. Cellar Power Off "p" is generated when the power in the 12 volt DC battery charging circuit 410 of FIG. 4 is off. Whether or not the fan or the alarm is on or off is immaterial. Likewise, the cellar is on standby "s" when the power to the 12 volt DC circuit 410 is on and the fan 420 is off and the alarm 430 is off. In other words, in the standby status state, power is available, but the fan and alarm are both off. When the cellar fan is turned on (such as to bring cooler air in from the outside), this is detected on lead 440b, and the central control computer 90 delivers the "f" alpha character, indicating the cellar fan is on when both the power is on and the fan is on. The alarm state is off.

Likewise, an alarm condition "a" is generated when the alarm circuit 430 is on and the power 410 is on. The status of the fan is immaterial under this logic. Finally, the page alpha character "x" is delivered when the central control computer 90 does not have a response from a particular potato cellar for a period of time, such as 50 minutes.

6. Graphic Display Embodiment

Figure 5:
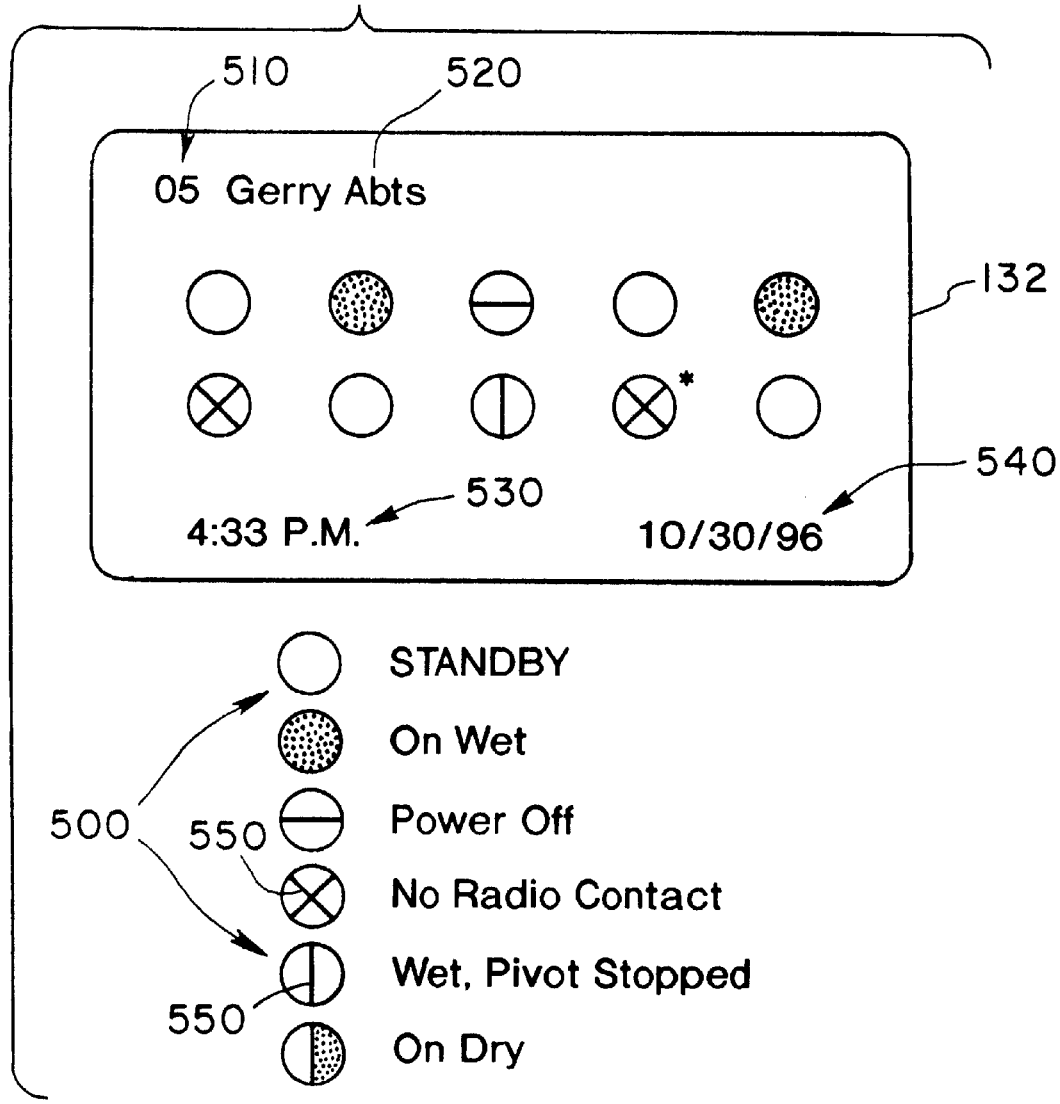
FIG. 5 is a pager display illustrating the status information as graphic icons.

In FIG. 5, a second embodiment for the display 132 is shown. This second embodiment utilizes graphical icons 500 to graphically display the status of each piece of field equipment (in this case, a pivot). An asterisk in the upper right-hand corner of the graphical icon 500 can indicate a change in status.

Hence, in FIG. 5, the page number 510 is displayed along with the operator's name 520. In FIG. 5, ten pivots comprise a group (i.e., page number 5). The ninth pivot has an asterisk in the upper right-hand corner which indicates that the ninth pivot changed status and has no present radio contact. In the lower portion of the display is the time of the page 530 and the date of the page 540.

Any suitable graphical icon 500 can be utilized to indicate the status signal for the display 132.

Although FIG. 5 shows one page (i.e., page number 5), it is to be understood that a conventional pager can store up to 20 pages, thereby making it easy for the farmer or operator to page backward to prior pages to quickly review the history of the change in statuses of his pivots in one or more groups. The date and time are included on all stored pages.

7. Combinations of Field Equipment

Figure 6:
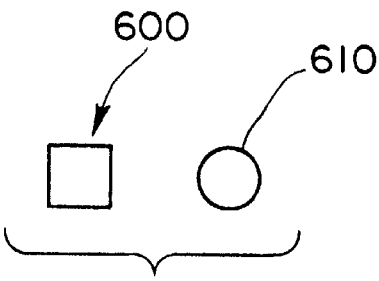
FIG. 6 is an illustration where the shape of the graphical icon identifies the type of field equipment.

In the two examples discussed above (i.e., pivots in FIG. 1 and potato cellars in FIG. 4), it is to be understood that the present invention can report on the status of different field equipment within a group. For example, a farmer may have five pivots, two grain elevators, and three potato cellars. Under the teachings of the present invention, these various pieces of field equipment could be reported upon. For example, in FIG. 5, pivots could use the circular icon 500, whereas potato cellars could be designated with a square icon. Hence, the outer shape of the icon 500 could designate the type of field equipment. For example, in FIG. 6, icon 600 is square and could be used to designate a potato cellar, whereas icon 610 is circular, and could be used to designate a pivot. As shown in FIG. 5, the status indicators 550 indicate the status of the piece of field equipment.

The above disclosure sets forth a number of embodiments of the present invention. The present invention is not to be limited to field equipment such as pivots and potato cellars, but finds application in grain elevators, other irrigation and crop monitoring systems, and other similar agricultural farm equipment. Other arrangements or embodiments, not precisely set forth, may be practiced under the teachings of the present invention and as set forth in the following claims.

I claim:

1. A pager message system for monitoring the operation of a plurality of controllers in each one of a plurality of agricultural field equipment, said pager message system comprising:

a plurality of sensors at each of said plurality of agriculture field equipment, one of said plurality of sensors connected to one of said plurality of controllers for issuing a status signal corresponding to the status of said connected controller, a plurality of remote terminal units, one of said plurality of remote terminal units connected to said plurality of sensors at each of said plurality of agriculture field equipment, said remote terminal unit transmitting status signals whenever one status signal changes and whenever a predetermined time period elapses, a central control computer receiving said transmitted status signals from said transmitting remote terminal unit, said central control computer analyzing said transmitted status signals for generating at least one changed status paging message only when a changed status signal occurs, a paging terminal, said central control computer delivering said at least one changed status paging message for all remaining agriculture field equipment in said plurality of agriculture field equipment to said paging terminal whenever one of said remote plurality of terminal units transmits said changed status signals, at least one pager, said paging terminal delivering said delivered changed status paging messages to said at least one pager, said at least one pager displaying said changed status paging messages, said changed status paging message being marked when displayed.

2. The pager message system of claim 1 wherein said agricultural field equipment is pivot irrigation equipment.

3. The pager message system of claim 2 wherein said plurality of controllers at least includes control circuit power, speed control, and wet control and wherein said plurality of sensors at least includes a power control sensor, a pivot running sensor and a wet control sensor.

4. The pager message control system of claim 3 wherein said at least one changed status paging message is at least derived from the status signals from said power control sensor, said speed control sensor and said wet control sensor.

5. The pager message control system of claim 1 wherein said agriculture field equipment is potato cellar storage equipment.

6. The pager message control system of claim 5 wherein said plurality of controllers at least includes control circuit power, fan power, and an alarm, and wherein said plurality of sensors at least includes a power control sensor, a fan sensor, and an alarm sensor.

7. The pager message control system of claim 6 wherein said changed status is at least derived from the status signals from said power control sensor, said fan sensor, and said alarm sensor.

8. The pager message control system of claim 1 further comprising an isolation device between said one of said plurality of sensors connected to said one of said plurality of controllers.

9. The pager message control system of claim 1 wherein said central control computer generates a loss of communication changed status paging message whenever communication is lost with one of said plurality of field equipment for a predetermined period of time.

10. The pager message control system of claim 1 wherein said displayed changed status messages marks changed agricultural field equipment with a "( )".

11. The pager message control system of claim 1 wherein said displayed changed and unchanged status paging messages use graphical icons.

12. The pager message control system of claim 11 wherein the outer shape of the graphical icon defines the type of said agricultural field equipment and wherein the inner design of the graphical icon defines the status message.

13. A pager message system for monitoring the operation of a plurality of controllers in each one of a plurality of pivot irrigation equipment, said pager message system comprising:

a plurality of isolation devices at each of said plurality of pivot irrigation equipment, a plurality of sensors at each of said plurality of pivot irrigation equipment, one of said plurality of sensors connected through one of said plurality of isolation devices to one of said plurality of controllers for issuing a status signal corresponding to the status of said connected controller, a plurality of remote terminal units, one of said plurality of remote terminal units connected to said plurality of sensors at each of said plurality of pivot irrigation equipment, said remote terminal unit transmitting status signals whenever one status signal changes, a central control computer receiving said transmitted status signals from said transmitting remote terminal unit, said central control computer analyzing said transmitted status signals for generating at least one changed status paging message for said transmitting remote terminal unit, a paging terminal, said central control computer delivering said changed status paging message for all remaining pivot irrigation equipment in said plurality of pivot irrigation equipment to said paging terminal whenever one of said remote plurality of terminal units transmits said changed status signals, at least one pager, said paging terminal delivering said delivered changed status paging message to said pager, said pager displaying said changed status paging messages, said changed status paging message being marked when displayed, said plurality of controllers at least includes power control, speed control, and wet control and wherein said plurality of sensors at least includes a power control sensor, a speed control sensor and a wet control sensor.

14. The pager message control system of claim 13 wherein said at least one changed status paging message is a least derived from the status signals from said power control sensor, said speed control sensor and wet control sensor.

15. A pager message system for monitoring the operation of a plurality of controllers in each one of a plurality of pivot irrigation equipment, said pager message system comprising:

a plurality of isolation devices at each of said plurality of pivot irrigation equipment, a plurality of sensors at each of said plurality of pivot irrigation equipment, one of said plurality of sensors connected through one of said plurality of isolation devices to one of said plurality of controllers for issuing a status signal corresponding to the status of said connected controller, a plurality of remote terminal units, one of said plurality of remote terminal units connected to said plurality of sensors at each of said plurality of pivot irrigation equipment, said remote terminal unit transmitting status signals whenever one status signal changes, a central control computer receiving said transmitted status signals from said transmitting remote terminal unit, said central control computer analyzing said transmitted status signals for generating at least one changed status paging message for said transmitting remote terminal unit, a paging terminal, said central control computer delivering said changed status paging message for all remaining pivot irrigation equipment in said plurality of pivot irrigation equipment to said paging terminal whenever one of said remote plurality of terminal units transmits said changed status signals, at least one pager, said paging terminal delivering said delivered changed status paging messages to said pager, said pager displaying said changed status paging messages, said changed status paging message being marked when displayed, said central control computer generates a loss of communication changed status paging message whenever communication is lost with one of said plurality of pivot irrigation equipment for a predetermined period of time.

16. A pager message system for monitoring the operation of a plurality of controllers in each one of a plurality of pivot irrigation equipment, said pager message system comprising:

a plurality of isolation devices at each of said plurality of pivot irrigation equipment, a plurality of sensors at each of said plurality of pivot irrigation equipment, one of said plurality of sensors connected through one of said plurality of isolation devices to one of said plurality of controllers for issuing a status signal corresponding to the status of said connected controller, wherein said plurality of controllers at least includes power control, speed control, and wet control and wherein said plurality of sensors at least includes a power control sensor, a speed control sensor and a wet control sensor, a plurality of remote terminal units, one of said plurality of remote terminal units connected to said plurality of sensors at each of said plurality of pivot irrigation equipment, said remote terminal unit transmitting status signals whenever one status signal changes, a central control computer receiving said transmitted status signals from said transmitting remote terminal unit, said central control computer analyzing said transmitted status signals for generating at least one changed status paging message for said transmitting remote terminal unit, wherein said changed status paging message is at least derived from the status signals from said power control sensor, said speed control sensor and said wet control sensor and wherein said central control computer generates a loss of communication changed status paging message whenever communication is lost with one of said plurality of pivot irrigation equipment for a predetermined period of time, a paging terminal, said central control computer delivering said changed status paging message for all remaining pivot irrigation equipment in said plurality of pivot irrigation equipment to said paging terminal whenever one of said remote plurality of terminal units transmits said changed status signals, at least one pager, said paging terminal delivering said delivered changed status paging message to said pager, said pager displaying said changed status paging message, said changed status paging message being marked when displayed.

17. A method for monitoring the operation of a plurality of controllers in each one of a plurality of agricultural field equipment, said method for monitoring comprising the steps of:

issuing from a remote terminal unit status signals corresponding to the status of the plurality of controllers, transmitting over a communication channel the issued status signals to a central control computer whenever one status signal changes, receiving the transmitted status signals at the central control computer, analyzing the received status signals at the central control computer, generating at the central control computer at least one changed status paging message identifying the location of the agricultural field equipment having the one status signal change, generating at the central control computer unchanged status paging messages identifying the location of the remaining agricultural field equipment, delivering the changed status paging message and unchanged status messages to a least one pager, displaying at said pager said changed and unchanged status paging messages, said changed status paging message being marked when displayed thereby marking the agricultural field equipment issuing the changed status paging message, wherein the step of transmitting the issued status signals further includes the step of transmitting the issued status signals as radio frequency signals, wherein the step of delivering further comprises the steps of:

delivering the changed and unchanged status paging messages over a telephony link to a pager control system, the pager control system delivering the changed and unchanged status paging messages over a paging link to at least one pager.

18. A method for monitoring the operation of a plurality of controllers in each one of a plurality of agricultural field equipment, said method for monitoring comprising the steps of:

issuing from a remote terminal unit status signals corresponding to the status of the plurality of controllers, transmitting over a communication channel the issued status signals to a central control computer whenever one status signal changes, receiving the transmitted status signals at the central control computer, analyzing the received status signals at the central control computer, generating at the central control computer at least one changed status paging message identifying the location of the agricultural field equipment having the one status signal change, generating at the central control computer unchanged status paging messages identifying the location of the remaining agricultural field equipment, delivering the changed status paging message and unchanged status messages to at least one pager, displaying at said pager said changed and unchanged status paging messages, said changed status paging message being marked when displayed thereby marking the agricultural field equipment issuing the changed status paging message, wherein each unchanged status message is displayed in the form of:

location, status and wherein the changed status message is displayed in the form of:

(location, status)

wherein the () marks the changed status message.

19. A method for monitoring the operation of a plurality of controllers and for commanding the operation of a least one power circuit in each one of a plurality of agricultural field equipment, said method for monitoring comprising the steps of:

issuing at least one command signal for an identified agricultural field equipment from a remote location, delivering the issued at least one command signal to a first pager located at a central control computer, the central control computer transmitting the delivered at least one command signal to the at least one power circuit at the identified agricultural field equipment, commanding the operation of the at least one power circuit at the identified agricultural field equipment, issuing from an RTU status signals corresponding to the status of the plurality of controllers, transmitting over a communication channel the issued status signals to a central control computer whenever one status signal changes such as in response to the commanded operation;

receiving the transmitted status signals at the central control computer, analyzing the received status signals at the central control computer, generating at a central control computer at least one changed status paging message identifying the location of the agricultural field equipment having the one status signal change, generating at a central control computer unchanged status paging messages identifying the location of the remaining agricultural field equipment, delivering said at least one changed status paging message and unchanged status messages to a second pager at the remote location, displaying said at least one changed and unchanged status paging messages in the second pager, said changed status paging message being marked when displayed thereby marking the agricultural field equipment issuing the changed status paging message.

* * * * *